United States Patent [19]
Leib

[11] Patent Number: 6,028,724
[45] Date of Patent: Feb. 22, 2000

[54] ABSORBENT LASER RESISTANT STRUCTURE

[75] Inventor: Kenneth G. Leib, Wantagh, N.Y.

[73] Assignee: Northrop Grumman Corporation, Los Angeles, Calif.

[21] Appl. No.: 05/526,605

[22] Filed: Nov. 22, 1974

[51] Int. Cl.[7] .................................. G02F 1/36; G02B 5/30
[52] U.S. Cl. ........................... 359/886; 359/887; 359/890
[58] Field of Search ..................................... 250/510, 514, 250/51, 517; 343/18 A, 18 E; 350/168, 267, 276, 321; 428/112, 913; 109/29; 244/121, 117 A, 129 W; 102/105 F; 89/36 A; 165/47

[56] References Cited

U.S. PATENT DOCUMENTS

| B 527,669 | 1/1976 | Poulsen | 331/94.5 T |
|---|---|---|---|
| 3,267,807 | 8/1966 | Swope et al. | 89/36 A |
| 3,344,434 | 10/1967 | Beckmann et al. | 350/267 |
| 3,492,062 | 1/1970 | Hoover | 350/312 |
| 3,521,940 | 7/1970 | Heckman | 350/168 |
| 3,734,815 | 5/1973 | Schorel et al. | 89/36 A |

FOREIGN PATENT DOCUMENTS

| 1208213 | 10/1970 | United Kingdom | 350/312 |
|---|---|---|---|

OTHER PUBLICATIONS

Leib, "Determination of the Alternation of Laser Beams by Clouds of Particulate Mattes", Jan. 1973, pp. 1–30, NTIS Publ. AD 756205, Copy in G–222.

Spencer et al, "1R Laser Radiation Eye Protector", Oct. 1972, pp. 1545–1546, Rev. Sci. Inst., vol. 43, #10, Copy in 350/312.

De Ment, "Directed Energy Weapons", Aug. 1962, pp. 92–96, Electronic Industries, Copy in 219/121L.

*Primary Examiner*—Nelson Moskowitz
*Attorney, Agent, or Firm*—Terry J. Anderson; Karl J. Hoch, Jr.

[57] ABSTRACT

A multi-layer structure for controlling the transmission laser radiation including an outer layer which is slightly absorbent to incident laser radiation and an intermediate layer which is substantially absorbent to incident laser radiation to achieve significant attenuation of on-axis transmission of laser radiation in an otherwise transparent structure.

7 Claims, 1 Drawing Sheet

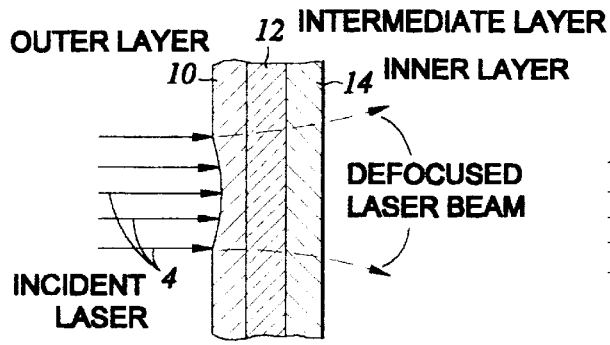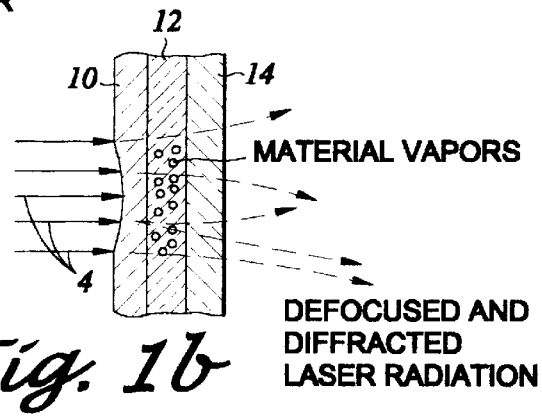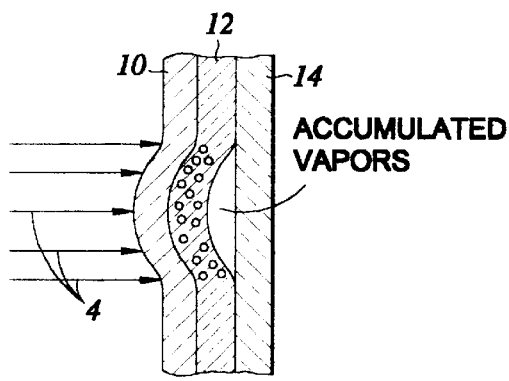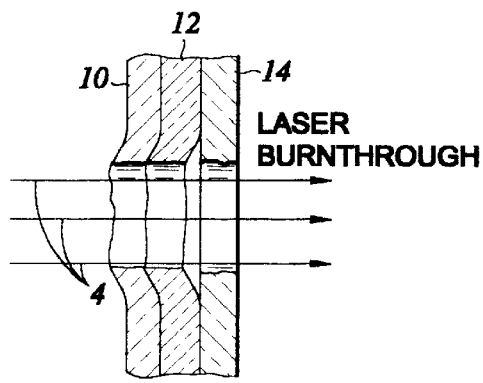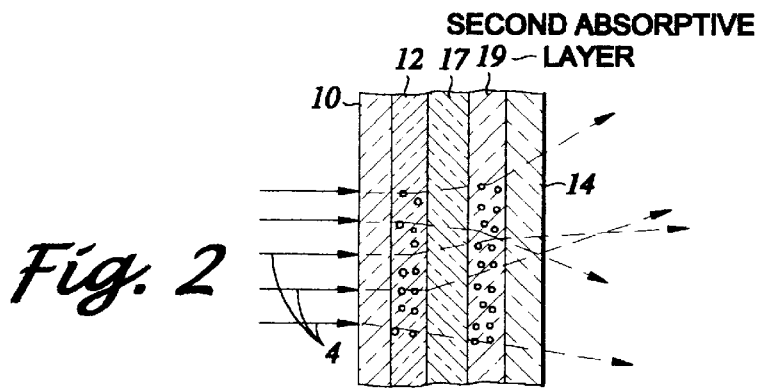

ABSORBENT LASER RESISTANT STRUCTURE

The following co-pending applications by the same Applicant are related to the present application:

1. "Partially Ablating Laser Resistant Structures", Ser. No. 526,602, filed simultaneously with the present application;
2. "Beam Scattering Laser Resistant Structures", Ser. No. 526,604, filed simultaneously with the present application; and
3. "Heat Conducting Laser Resistant Structures", Ser. No. 526,603, filed simultaneously with the present application.

BACKGROUND

The present invention relates to a multi-layer structure for controlling the transmission of laser radiation, and more specifically to a multi-layer structure whose intermediate layer absorbs the energy from incident laser radiation to decompose and diffract the laser beam to effect significant attenuation thereof. This invention may be used in such structures as aircraft canopies and windshields, helmets and glasses.

In recent years there has been considerable interest in, and a growing development of, lasers whose output optical radiation is of a high intensity. By optical radiation as used herein is meant any portion of the electromagnetic spectrum between about 0.4 and about 15.0 micrometers, and is not confined to the visible portion of the spectrum. Already, considerable effort has been directed toward the development of communication systems utilizing lasers while further technical development is being directed toward the use of a laser as a weapon against aircraft.

Many recent optical devices are fabricated with glass, glass laminates, plastics and plastic laminates to achieve various effects under sunlight or artificial light conditions. Several of these devices have been designed with the idea that light will be diminished as it passes through the device. Many modern applications require these devices to transmit light in the visible portion of the spectrum but diminish light from high intensity laser radiation.

To date, laser weapons have two practical threat wavelengths:

1) approximately 10 micrometers (infrared); and,
2) the range 3 to 5 micrometers.

Depending upon the material exposed to the incident laser beam, the energy from each of these threat wavelengths will either be absorbed by or transmitted through the layer of material in the structure. In general, however, plastics will be absorbing to the 10 micrometer laser while some will transmit in the 3–5 micrometer range. Thus, based upon intelligence reports, different structures and/or materials will be employed according to which laser wavelength is anticipated.

One light disruptive device is disclosed in the patent to Horton, U.S. Pat. No. 3,561,842. The structure relies on the heating effect of absorbed high-intensity optical radiation to destroy a film of light transmissive material which is bonded to a roughened substrate. When high intensity optical radiation impinges the film surface, the energy is absorbed and the film is destroyed, exposing the roughened substrate which deflects the beam. The roughened substrate is a source of possible shortcomings in that it presents additional fabrication steps, difficulties in providing a continuous index of refraction and increased energy absorption of radiation due to the roughened surface. In addition the roughened substrate is a pre-induced damage control device whereas the present invention concerns a self-induced damage mechanism.

Aircraft canopies and windscreens have generally been designed for aerodynamic and economic reasons rather than for laser weapon protection. They are constructed to incorporate the following characteristics:

a) Aerodynamic compatibility with the shape factor of the aircraft;
b) Structural soundness under prescribed aerodynamic environments;
c) Good visibility (transparency in the visible portion of the spectrum); and
d) Ease of fabrication.

However, in view of the developments in laser technology it is now desirable that aircraft canopies and windscreens also:

e) be capable of withstanding laser radiation for a sufficient time (e.g. t>1 second) to enable the pilot to assume a change in aircraft attitude;
f) be aerodynamically sound to enable the pilot to carry out his assigned mission and/or return to his home base after having been exposed to some maximum level of radiation;
g) to reduce the on-axis level of radiation transmitted, thereby lowering the level of exposure to the pilot.

SUMMARY OF THE INVENTION

It is therefore an object of the present invention to provide laser resistant structures for attenuating high energy laser radiation.

It is another object of the present invention to provide laser resistant structures having improved radiating heat resistant and absorption properties.

A further object of the present invention is to provide laminated structures having variable light transmission properties.

A still further object of the present invention is to provide a laminated laser resistant structure for protection in a high intensity laser radiation environment.

A still further object of the present invention is to provide a laminated structure for protection in a high intensity laser radiation environment in which the wavelength of the radiation is altered.

Other objects, aspects, and advantages of the present invention will be apparent when the detailed description is considered with the drawing.

A laser resistant structure is provided for aircraft windscreens or canopies which is capable of furnishing an aerodynamically functional form and also mitigating the effect of incident laser radiation. The reduced effectiveness of the laser beam affords a pilot the time to assume a defensive attitude or an offensive posture. Further protection for the pilot and/or aircraft crew can be realized by providing these personnel with improved safety glasses and/or helmets which, in conjunction with the improved canopy and/or windscreen, would extend aircraft capability through increased pilot protection. The principle of operation of the present invention emanates from self-destructing irreversible material processes resulting from partial absorption of incident laser radiation by the outer layer and by substantial absorption of the laser by the intermediate layer to substantially mitigate on-axis transmission of the radiation.

According to the present invention, the level of radiation penetrating the laser resistant structure is reduced by controlled absorption and optical scattering.

BRIEF DESCRIPTION OF THE DRAWINGS

With reference to the drawings:

FIGS 1a, 1b, 1c and 1d illustrate the negative lens and beam scattering form of the light transmission attenuation device according to the present invention;

FIG. 2 illustrates the present invention having more than one layer of decomposing material.

DETAILED DESCRIPTION OF THE PREFERRED EMBODIMENTS

Referring to FIG. 1a, one form of the laser resistant structure includes an outer layer 10, an inner layer 14 and an intermediate layer 12. The three layers have identical or virtually identical indices of refraction at visible wavelengths. Layer 12 is composed of transparent material in the visible portion of the electromagnetic spectrum being highly absorptive to anticipated threat laser radiation, whereby it vaporizes and decomposes when exposed thereto. Layers 10 and 14 are characterized by their low absorption to the anticipated threat laser radiation and transparency at visible wavelengths. Thus, where $\alpha_i$ is the absorption coefficient at the wavelength of the incident radiation $\lambda_i$, the relative absorptivities are:

$$\alpha_{12} \gg \alpha_{10} \approx \alpha_{14}$$

Structurally, the intermediate layer need not have great rigidity. The modulus of elasticity, E, for each of the different layers may hold the following relationship:

$$E_{14} \gg E_{10} \geq E_{12}.$$

A typical structure includes layer 14 made of plate glass, or fused silica, layer 12 made of polyvinyl alcohol with an absorbing molecule (for example, a halogen) and layer 10 may be cellulose acetate butyrate, plexiglas, Plex II or Plex 55.

In operation, laser radiation, 4, is incident upon the structure as shown in FIG. 1a. After a very short time, about less than a tenth of a second, layer 10 undergoes an index of refraction change such that it forms an equivalent negative lens, which causes the optical beam to diverge, thereby defocusing the approximately collimated incident beam. This defocusing very quickly reduces the power density being transmitted to the succeeding layers. The negative lens forms because the incident laser beam has a Gaussian beam intensity distribution which places the maximum power at the center. This suggests that beams with other cross-sectional areas might tend to focus instead of defocus. However, other factors such as the practicality of producing such lasers preclude this approach in current laser weapon design.

A short time later (about two tenths of a second or less) the highly absorbing intermediate layer, 12, begins to decompose and/or vaporize, producing small bubbles as shown in FIG. 1b. These bubbles are generated in large number-density and measure, at most, $10^{-2}$ times less than the diameter of the incident beam which is also much larger than the incident wavelength. The bubbles further aid laser attenuation by decreasing the beam density through multiple scattering. Tests have shown that the on-axis intensity of beam penetrating the entire structure was less than 0.01 that of the incident beam.

When the beam remains incident upon the structure surface, vaporized material accumulates between the outer and intermediate layers and a single large bubble is formed between them due to the internal pressure built up in the intermediate layer. The single bubble expands as the matrix of small bubbles remains in the intermediate layer to prolong the laser attenuation. The on-axis radiation, or that along the direction of the incident radiation, is substantially reduced because the bubbles traped in the intermediate layer cause considerable optical aberrations to the beam. The radiation which reaches the inside of the laminate is $10^{-3}$ or less than that incident upon the outer surface. When sufficient pressure has developed for sufficiently long periods of time, the bubble bursts and burn-through occurs as shown in FIG. 1d. However, this occurs only after a significant time has elapsed since the incident radiation was first applied. In the case of an aircraft structure, this would occur long after evasive action should have been implemented.

The laser radiation attenuation exhibited by this aspect of the present invention is significantly enhanced if the intermediate layer, 12, is followed by layers 17 and 19 which have substantially the same properties as layers 14 and 12 respectively, as shown in FIG. 2. The resultant structure exhibits two advantages: first, as the laser remains incident upon the five-layered structure, a small portion of its energy would be absorbed by layer 19 which would decompose to form bubbles similar to layer 14. These bubbles would further scatter the laser beam to reduce even further the effective laser radiation penetrating the entire structure. Secondly, after the laser had ablated the first two layers, it would encounter a structure comprising layers 17, 19 and 14 which is virtually the same device as described in conjunction with FIG. 1. Thus, incident laser radiation will not only initially penetrate the entire structure at an intensity significantly less than $10^{-3}$ the incident intensity but also it will require a greater period of time to completely burn through the structure.

The above described aspects of the present invention were discussed with reference to a three-layered structure. It should be understood by those skilled in the art that these are merely illustrative embodiments, as laser attenuating structures constructed in accordance with the present invention can include more than three layers. It should therefore be understood that various modifications in the present invention can be made in construction and arrangement without departing from the spirit and scope of the invention as defined in the appended claims.

What is claimed is:

1. A laser resistant structure comprising:

an outer layer, said outer layer being essentially transmissive to a predetermined band of laser radiation wavelengths and being adapted to undergo a change in index of refraction distribution under the influence of incident laser radiation to form a generally negative lens for de-focusing the incident laser radiation;

an intermediate layer, said intermediate layer being substantially absorptive to the band of laser radiation wavelengths and being adapted to decompose and form gas bubbles for further diffracting laser radiation penetrating to said intermediate layer; and an inner layer, said outer, intermediate and inner layers having substantially equal indicies of refraction in the visible portion of the electromagnetic spectrum, such that said outer and intermediate layers are irreversibly altered to reduce substantially the on-axis intensity of the incident laser radiation.

2. A laser resistant structure in accordance with claim 1, wherein the outer layer is cellulose acetate butyrate, the intermediate layer is polyvinyl alcohol with an absorbing molecule and the inner layer is fused silica.

3. A laser resistant structure in accordance with claim 1, wherein the outer layer is plexiglas, the intermediate layer is polyvinyl alcohol with an absorbing molecule and the inner layer is fused silica.

4. A laser resistant structure in accordance with claim 1, wherein the outer layer is Plex II, the intermediate layer is polyvinyl alcohol with an absorbing molecule and the inner layer is fused silica.

5. A laser resistant structure in accordance with claim 1, wherein the outer layer is Plex 55, the intermediate layer is polyvinyl alcohol with an absorbing molecule and the inner layer is fused silica.

6. A laser resistant structure in accordance with claim 1 which further includes a fourth layer and a fifth layer between said intermediate layer and said inner layer wherein said fourth and fifth layers have indicies of refraction in the visible portion of the electromagnetic spectrum substantially equal to said outer, intermediate and inner layers and wherein said fifth layer is substantially absorptive to incident laser radiation such that it decomposes under the influence of incident laser radiation to form gas bubbles for diffracting laser radiation.

7. The laser resistant structure in accordance with claim 6 wherein said fourth layer undergoes a change in index of refraction distribution under the influence of laser radiation to form a negative lens for defocusing laser radiation.

* * * * *